L. SMITH.
Seed Planter.
No. 106,631.  Patented Aug. 23, 1870.
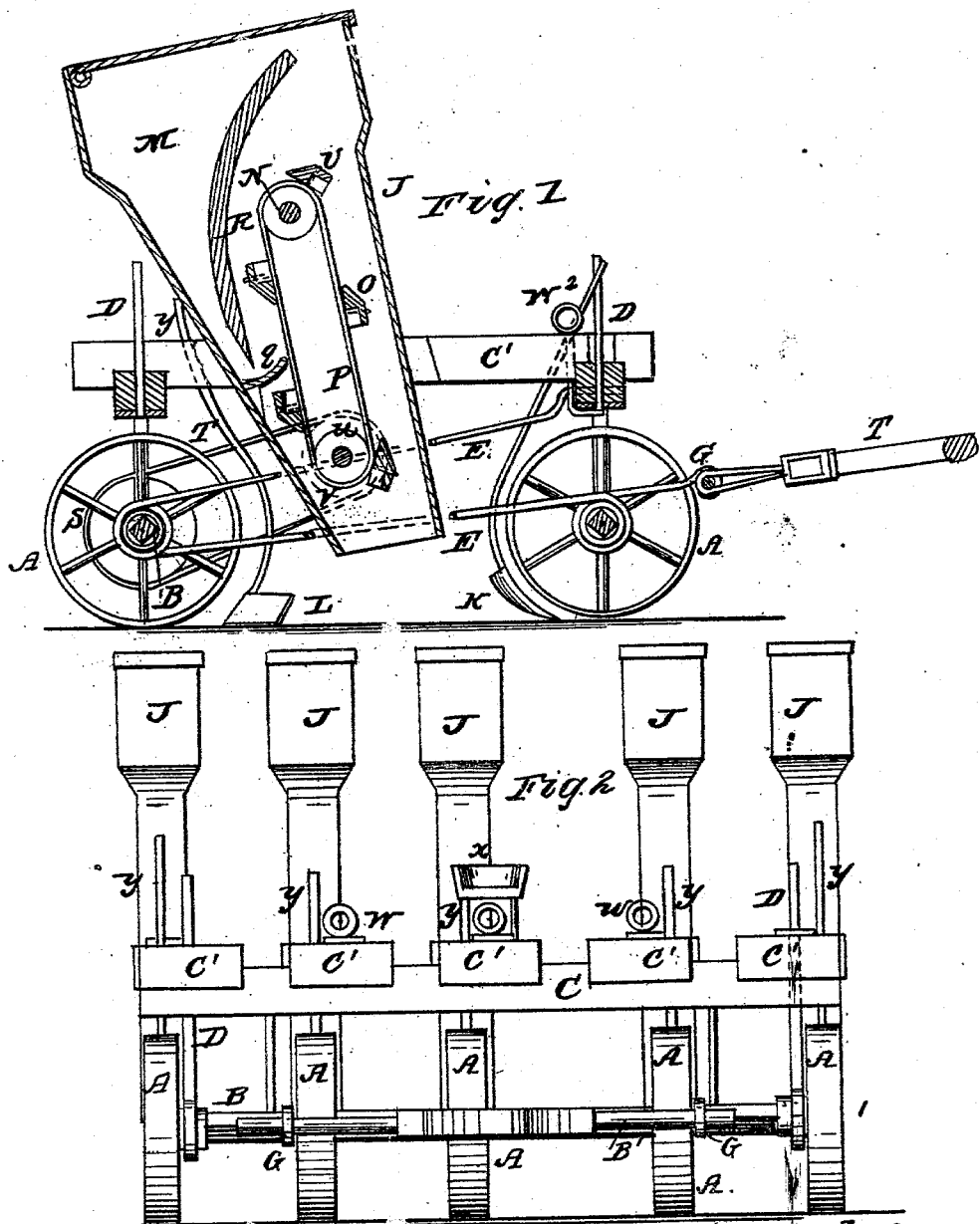

United States Patent Office.

LEVI SMITH, OF CHESTER CENTRE, MASSACHUSETTS.

Letters Patent No. 106,631, dated August 23, 1870.

IMPROVEMENT IN SEED-PLANTER.

The Schedule referred to in these Letters Patent and making part of the same.

*To all whom it may concern:*

Be it known that I, LEVI SMITH, of Chester Centre, in the county of Hampden and State of Massachusetts, have invented a new and useful Improvement in Seed-Planters; and I do hereby declare that the following is a full, clear, and exact description thereof, which will enable others skilled in the art to make and use the same, reference being had to the accompanying drawing forming part of this specification.

This invention relates to new and important improvements in machines for planting seeds, more especially designed for planting corn, but applicable to other kind of seed, whereby much time is saved; and It consists in the construction and arrangement of parts hereinafter described.

In the accompanying drawing—

Figure 1 represents a sectional side elevation of the machine, showing the grain-reservoir, and the method of discharging or dropping the grain.

Figure 2 is an end elevation.

Similar letters of reference indicate corresponding parts.

This machine is mounted on a series of wheels, A, more or less in number.

B represents the axles. The outside wheels, at the front and the rear, are made fast to the ends of the axles. The intermediate wheels are made adjustable on the axles.

C represents the frame, which is supported from the axles, by stands, at the four corners of the machine, the lower ends of which stands form boxes in which the axles revolve.

D are the stands.

The frame is strengthened by the rods E, which connect with the front piece of the frame, and pass back and around the rear axle, then return to and around the front axle, as seen in fig. 1, with eyes, G, formed in their projecting ends, through which the draft-bar B' passes, as seen in fig. 2.

The tongue I is adjustably attached to this draft-bar, so that it can be slipped laterally in either direction.

J represents the seed-reservoirs, which, in number, correspond with the front wheels A.

These reservoirs are attached to the timbers C', which timbers are halved onto the cross-frame timber C, front and rear.

The intermediate reservoirs are (with the timbers to which they are attached) adjustable laterally with the intermediate wheels A. More or less in number of these intermediate reservoirs may be employed, which, with the adjustment of which they are susceptible, allows the width between the rows to be varied as may be desired.

In the rear of each of the front wheels there is a plow, K, of the shovel kind, for forming a furrow for the seed, and in front of the rear wheels is a coverer, L, which scoops the earth to the center of the rows. The rear wheel follows and passes down the earth onto the seed.

The seed is placed in the compartment M, and is carried up and around the pulley N by the cups O in the endless belt P, and dropped into the furrow from the lower end of the reservoir.

Q is an elastic flap, which acts as a stop to the seed.

R is a partition.

The endless belt is revolved, by the rear axle, from pulleys S, by means of belts T.

The arbor of the pulleys U of the belt P extend through the reservoir, on the ends of which are pulleys V, as shown in fig. 1. In planting corn the cups O are designed to contain sufficient corn for one hill each. The distance of the hills from each other is governed by the relative proportions (as to diameter) of the pulleys.

The mode of fastening the timber C' after they have been adjusted is seen in fig. 1.

W are button-hooks for that purpose.

X is the driver's seat.

The plows and the coverers K and L are attached to rods Y and Z, which rods extend up through the timbers C', so that they are made adjustable with the reservoirs J.

This machine is drawn by either one or two horses, and will plant, in the most perfect manner, four (more or less) rows of corn at the same time. It makes the furrows, drops and covers the corn, and presses down the earth onto the corn, at one and the same time.

The advantages of such a machine over ordinary methods of planting must be obvious to all.

Having thus described my invention,

I claim as new and desire to secure by Letters Patent—

1. The adjustable reservoirs J, with the partition R, flap Q, endless belt P, with the cups O thereon, combined, arranged, and operating substantially as and for the purposes described.

2. In combination with a seed-planter, the adjustable wheels A and pulleys S, on the axles of the machine, substantially for the purposes described.

3. In combination with a seed-planter, the plows K and coverers L, adjustable, substantially as described.

The above specification of my invention signed by me this 12th day of April, 1870.

LEVI SMITH.

Witnesses:
GEO. W. MABEE,
S. H. WALES.